United States Patent
Badger (10) Patent No.: US 12,301,908 B2
(45) Date of Patent: May 13, 2025

(54) CURATING PROMOTIONS

(71) Applicant: Sling TV L.L.C., Englewood, CO (US)

(72) Inventor: Trent Badger, Orem, UT (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 17/885,494

(22) Filed: Aug. 10, 2022

(65) Prior Publication Data
US 2024/0056624 A1    Feb. 15, 2024

(51) Int. Cl.
*H04N 21/2668* (2011.01)
*H04N 21/258* (2011.01)
*H04N 21/472* (2011.01)
*H04N 21/482* (2011.01)

(52) U.S. Cl.
CPC ... *H04N 21/2668* (2013.01); *H04N 21/25816* (2013.01); *H04N 21/472* (2013.01); *H04N 21/4826* (2013.01)

(58) Field of Classification Search
CPC ......... H04N 21/2668; H04N 21/25816; H04N 21/472; H04N 21/4826
USPC .......................................................... 725/25
See application file for complete search history.

(56) References Cited

U.S. PATENT DOCUMENTS

| | | | |
|---|---|---|---|
| 2004/0168184 A1* | 8/2004 | Steenkamp | H04N 21/63345 725/38 |
| 2006/0031899 A1* | 2/2006 | Rabin | G06Q 20/12 348/E7.071 |
| 2014/0157329 A1* | 6/2014 | Roberts | H04N 21/4882 725/61 |
| 2020/0356590 A1* | 11/2020 | Clarke | G06F 16/434 |

* cited by examiner

*Primary Examiner* — Alfonso Castro
(74) *Attorney, Agent, or Firm* — KW Law, LLP (57) ABSTRACT

Processes, computing systems, and devices perform operations to generate an interface for selecting streaming content on a client device. The operations include selecting a tile of video content for inclusion in a ribbon, compiling a set of eligibility keys that identify subscription levels with an upgrade path to access the video content of the tile, and compiling a set of lineup keys that identify subscription levels with access to the video content of the tile. A key associated with a user account is matched to the set of eligibility keys or the set of lineup keys to select the ribbon for presentation to the user account. The ribbon is transmitted to the client device in the interface for selecting the streaming content device in response to the user account associated with the key being authenticated on the client device.

20 Claims, 4 Drawing Sheets

CURATING PROMOTIONS

TECHNICAL FIELD

The following description generally relates to multimedia distribution systems, and more particularly, to providing temporally and contextually relevant media program recommendations in a personalized manner.

BACKGROUND

Content consumers can access media content from any number of different sources on any number of different services and devices. Content can be place shifted from one device to another, stored in a personal or digital video recorder (DVR), accessed on demand, or received by over-the-air broadcasts, for example. Some services integrate various sources and device types into a broad ecosystem offering a large quantity of content accessible through a single interface. The number of potential viewing options for users along with the amount of media content available for viewing has never been greater.

The volume of media content accessible to a user can tend to demand an undesirably long time dedicated to reviewing the potential content before making viewing decisions. In some instances, media consumers spend more time reviewing the potential content than viewing programming. While some systems recommend programming to users, those systems typically present a number of options for a number of categories, which often still entails users spending an undesirable amount of time to identify a program of interest.

Moreover, these systems often do not enable a user to review content that is likely of interest but currently outside the user's subscription package. For example, Sling TV offers subscriptions known as Blue and Orange with each package containing a different base set of channels and extendable with different add-on channels and packages. Promoting such content can entail curators manually generating promotions based on extensive knowledge of programming and available subscription combinations.

Accordingly, it is desirable to provide recommendations that are personalized, temporally and contextually relevant, and accurate without relying on specialized knowledge of individuals. Other desirable features and characteristics may also become apparent from the subsequent detailed description and the appended claims, taken in conjunction with the accompanying drawings and this background section.

BRIEF DESCRIPTION

Various embodiments relate to processes, computing systems, devices, and other aspects variously perform or include operations to generate an interface for selecting streaming content on a client device. The operations include selecting a tile of video content for inclusion in a ribbon, compiling a set of eligibility keys that identify subscription levels with an upgrade path to access the video content of the tile, and compiling a set of lineup keys that identify subscription levels with access to the video content of the tile. A key associated with a user account is matched to the set of eligibility keys or the set of lineup keys to select the ribbon for presentation to the user account. The ribbon is transmitted to the client device in the interface for selecting the streaming content device in response to the user account associated with the key being authenticated on the client device.

Various embodiments include a content selection system having a processor in communication with non-transitory data storage, wherein the processor is configured to execute instructions stored in the non-transitory data storage that cause the content selection system to perform operations. A computer program product may be tangibly embodied in a computer-readable storage device and comprise a set of instructions that when executed by a processor cause the processor to perform operations.

In various embodiments, the operations include receiving an input from the client device selecting the tile, and upgrading a subscription level of the user account in response to selection of the tile. Playback of the video content may begin on the client device in response to upgrading the subscription level of the user account. Playback of the video content on the client device may begin in response to the key associated with the user account matching the set of lineup keys. A ribbon curation interface is presented on a second client device for selecting the tile of video content for inclusion in the ribbon. The set of lineup keys that identify subscription levels with access to the video content of the tile corresponds to subscription levels selected in the ribbon curation interface. The set of eligibility keys that identify subscription levels with an upgrade path to access the video content of the tile corresponds to subscription levels selected in the ribbon curation interface. Other devices, systems, and automated processes may be formulated in addition to those described in this brief description.

DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

The following detailed description is intended to provide several examples that will illustrate the broader concepts set forth herein, but it is not intended to limit the invention or applications of the invention. Furthermore, there is no intention to be bound by any theory presented in the preceding background or the following detailed description.

Embodiments of the subject matter described herein generally relate to multimedia distribution systems that present recommended media content to a user based on a user's interests, subscription level, and available subscription upgrade paths. The recommendations can have predicted temporal and contextual relevance in a manner personalized to the user. As used herein, "media content," "media program," or variants thereof should be understood as referring to any audiovisual programming or content in any streaming, file-based or other format. Depending on the embodiment, the multimedia distribution system can be a cable distribution system, a satellite distribution system, web-based, a video-on-demand (VOD) platform, or other network distribution system or any suitable combination thereof (e.g., placeshifting from a cable or satellite distribution system via communications network). Accordingly, the subject matter described herein is not intended to be limited to any particular type of media content (e.g., live, recorded, on demand, or otherwise) or any particular type of content distribution (e.g., cable, satellite, streaming, or otherwise).

Content is presented based on a viewing customer's current subscription levels and potential upgraded subscription levels. A lineup key is associated with each customer account subscribed to a content delivery service. The lineup key indicates the current subscription level of the account and is useable to identify programming currently included in the account's content subscription. The key may not be a unique key, as multiple accounts often have identical subscription levels. Accounts can subscribe to the content delivery service by selecting one or more base packages and selecting any number of addon packages. The lineup key for an account indicates the base package and selected addon packages, if any, associated with the account.

An eligibility key is also associated with each customer account subscribed to a content delivery service. The eligibility key indicates content accessible to the customer account through an upgraded subscription level. Upgraded subscription levels can include changing or augmenting the base subscription package. Potential upgraded subscription levels can also include changing or adding addon packages to the subscription. The eligibility key may not be a unique key, as multiple accounts often have identical upgrade paths.

Usage information that quantifies or otherwise characterizes a user's consumption (or viewing) of media content is stored or otherwise maintained and utilized to determine that user's individual viewing characteristics. In this regard, the usage information pertains to preceding viewings of media content by the user, and may include, for example, information detailing the user's viewing history along with information detailing the context for the user's viewings. The user's viewing history information characterizes the media programs the user has viewed and may include, without limitation, the names, titles, or other identifiers associated with media programs the user has watched, along with other metadata associated with those media programs, such as, for example, genre identifiers, featured actors and/or actresses, directors, or producers, program descriptions or summaries, and the like. The user's viewing context information characterizes the context of the user's viewings of those media programs and may include, without limitation, the time of day or the day of the week associated with the preceding viewings, an identifier of the device utilized for the preceding viewings, a network location of the device, a geographic location associated with the device at the time of the preceding viewings, the media program types associated with the preceding viewings (e.g., recorded media programs, on-demand media programs, live or real-time media programs, etc.) and the like. Further information on tailoring promotions based on usage information and context is available in U.S. patent Ser. No. 10/341,728, which is incorporated by reference herein for any purpose.

In one or more exemplary embodiments, the recommended media programs are curated or otherwise identified from among currently available media programs that are available to users based on the lineup key or the eligibility key. For example, when a user logs in or otherwise initiates a new session for viewing media content, the recommendation engine may automatically identify media programs available for viewing by a user account by checking the scheduled availability times or air times of potential promoted content. The recommendation engine may also check a database of curated content for applicability to a lineup key or an eligibility key associated with the account. The recommendation engine may also score or select curated content for presentation based on user preferences, user history, or likely user interest in the curated content.

Thus, the user may be apprised of media programs that the user is likely to be interested in for which the user may not have knowledge of current availability. For example, an account subscribed to a base package may be presented with an upcoming sporting event accessible by adding a sports addon package to the base subscription. The recommendation can be triggered by similar users adding the sports package or viewing content accessible through the addon sports package. The recommendation may also be triggered by a user's past interest in content similar to content included in the addon sports package. The recommendation could be triggered by a major upcoming event such as a professional league final or a college sports championship. In each instance, the promoted content is content not included withing the subscription indicated by the lineup key.

Figure 1:
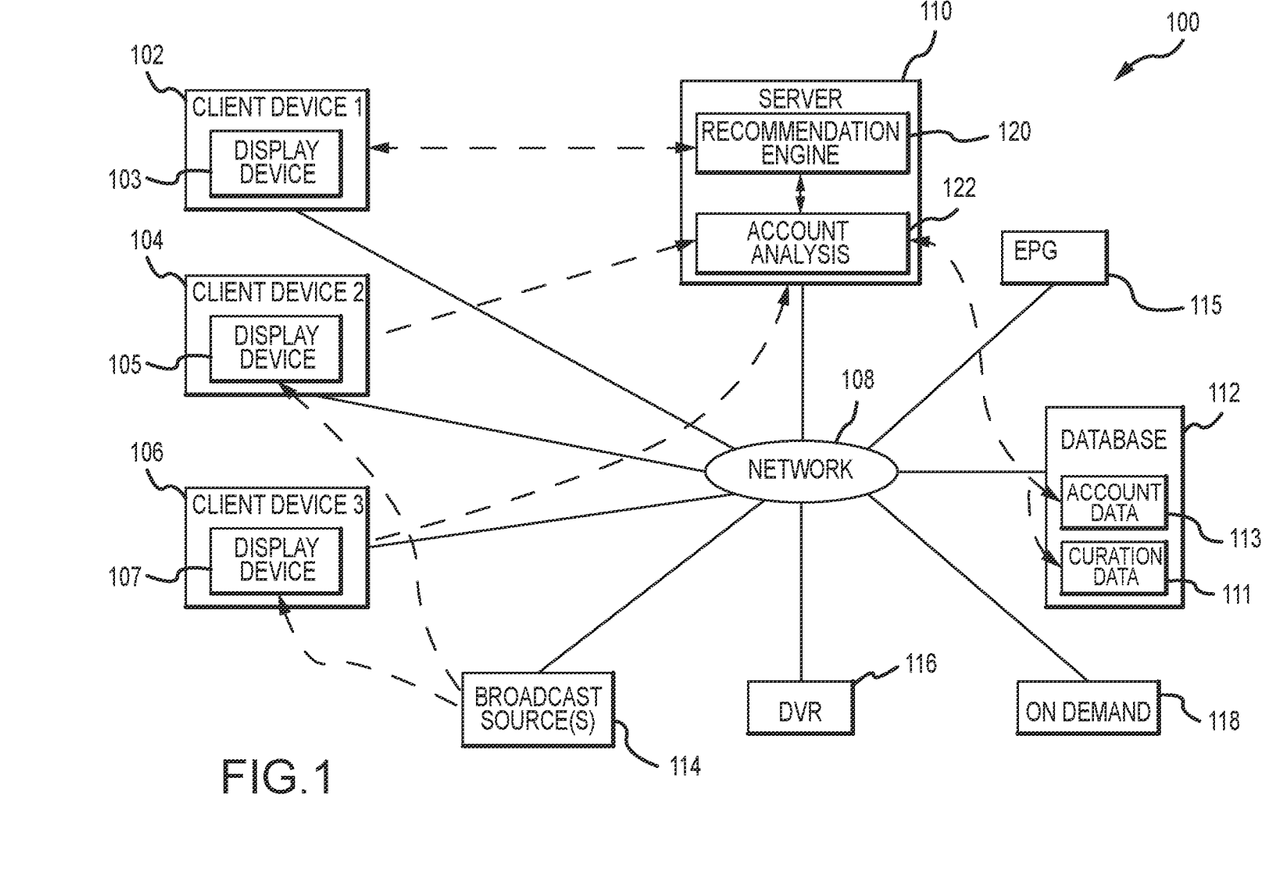
FIG. 1 illustrates a multimedia distribution system in accordance various embodiments.

FIG. 1 depicts an exemplary embodiment of a multimedia distribution system 100 for presenting relevant media programs to a user of client device 102 for selection. The multimedia distribution system 100 includes a host server 110 that communicates with the client device 102 over a network 108, and in response to a request from the client device 102, provides indication of recommended media programs currently available from one or more content sources 114, 116, 118. The host server 110 is in electronic communication with database 112, which stores account data 113 for individual users or accounts within the multimedia distribution system 100. Database 112 also stored curation data 111 identifying programming and associated metadata useable in making content recommendations. Database 112 may include one or more relational databases, big data stores, structured datasets, unstructured datasets, data streams, or other data storage formats. Host server 110 uses information associated with the accounts including lineup keys, eligibility keys, and viewing characteristics of the user along with curation data to select content for recommendation.

The host server 110 generally represents a computer system coupled to the network 108 and configured support the recommendation processes described herein, such as, for example, a web server, cloud-based system, computing cluster, load balancer, or other client-facing computing system capable of electronic communication with client devices over network 108. For purposes of explanation, but without limitation, the host server 110 is referred to herein as a server. The host server 110 may be part of a provider headend, master control, or other similar system or facility associated with management or administration of one or more aspects of the multimedia distribution system 100. The host server 110 includes at least a processing system or other hardware computing resources along with one or more data storage elements (or memory) capable of storing instructions, that, when read and executed by the processing system, cause the host server 110 to generate or otherwise support a recommendation engine 120 and an account analysis engine 122.

Account analysis engine 122 generally represents software running on host server 110 that receives or otherwise obtains usage information, subscription information, and eligibility information associated with user accounts. Account analysis engine 122 may use feedback information from client devices 102, 104, 106 via the network 108 for association with the account logged into those devices. Account analysis engine 122 stores or otherwise maintains the information in association with those accounts as account data 113 in the database 112. Account analysis engine 122 may also determine viewing characteristics for each user based on their respective usage information, subscription information, eligibility information, or other information suitable for consideration in making a content recommendation.

In some embodiments, account analysis engine 122 may identify or otherwise determine one or more similar users for each particular user and/or assign each user to a particular user group (or cluster) of users having similar viewing characteristics. In some embodiments, the viewing characteristics of all users may be aggregated to provide a relatively large data pool, which may then be analyzed to group similar users based on viewing histories or other behavioral patterns. The recommendation engine 120 generally represents the component of the host server 110 that receives or otherwise obtains requests from client devices 102, 104, 106, and in response, provides indication of recommended media programs for the respective user of a respective client device 102, 104, 106 based on that user's viewing characteristics, the user's current viewing context (e.g., the identity or location of the client device 102, 104, 106, the current time of day, the current day of the week, and the like), and other factors or user preferences, as described in greater detail below. For example, in some embodiments, the recommendation engine 120 receives current viewing information for similar users and generates or otherwise provides recommendations based at least in part on the current viewing behavior of similar users.

Recommendation engine access curation data 111 in database 112 to make recommendations in some embodiments. Curation data 111 may include a list of lineup keys, eligibility keys, content metadata, recommendation metadata, or other information useable to make a content recommendation. Content metadata can include content availability date and time, content category, content type, cast and crew information, content source, or other details describing to or relating to the content. Recommendation metadata can include an active date window, lineup keys suitable for receiving a recommendation, eligibility keys suitable for receiving a recommendation, recommendation presentation channels, tile configuration, ribbon identifier, ribbon title, tile identifier, tile title, or other information suitable for consideration in presenting content recommendations.

In exemplary embodiments, when a user of the client device 102, 104, 106 views media content, information describing or otherwise detailing the user's viewing behavior is transmitted, uploaded, or otherwise provided to account analysis engine 122 on host server 110. Host server 110 may in turn store or otherwise maintains that usage information as account data 113 associated with that particular user account in database 112. Account analysis engine 122 may process or otherwise analyze the usage information for each user to determine cumulative viewing characteristics representative of the user's viewing preferences, tendencies, or other behavior. In some embodiments, account analysis engine 122 may utilize demographics or other ancillary information to further refine the manner in which associations are established between users. Lineup keys and eligibility keys for each account are stored in database 112 as account data 113.

Each client device 102, 104, 106 may be realized as any type of electronic device suitable for communicating on the network 108 and presenting or otherwise reproducing media content to a user, such as, for example, a mobile or cellular telephone, a smartphone, a laptop or notebook computer, a tablet computer, a desktop computer, a personal digital assistant, a video game player, a portable media player or another media playback device, an e-reader, a wireless router, a wireless access point, a smart TV, a set-top box, a television receiver, a satellite receiver, or the like. In this regard, each client device 102, 104, 106 includes at least a processing system, a data storage element (or memory), and a display device 103, 105, 107 for reproducing multimedia content. The processing system may be implemented using any suitable processing system and/or device, such as, for example, one or more processors, central processing units (CPUs), controllers, microprocessors, microcontrollers, processing cores and/or other hardware computing resources configured to support the operation of the client devices 102, 104, 106 described herein. The data storage element is capable of storing programming instructions for execution by the processing system, that, when read and executed, cause processing system to create, generate, or otherwise facilitate a respective media player application (which could be a standalone application, a web browser plug-in, or the like) configured to support reproducing media content on the display device 103, 105, 107 associated with the respective device. It should be noted that although FIG. 1 depicts the display devices 103, 105, 107 as integrated with the client devices 102, 104, 106, in practice, the display devices 103, 105, 107 may be physically distinct and communicatively coupled with a respective client device 102, 104, 106 (e.g., via cable or wiring, short range wireless communications, or the like).

Still referring to FIG. 1, the broadcast source(s) 114 generally represent any sources of content or programming which provide media programs available for viewing by any number of client devices 102, 104, 106 within the multimedia distribution system 100, either via the network 108 or independently of the network 108. For example, depending on the embodiment, the broadcast source 114 could be realized as a satellite headend or satellite distribution system, cable headend or cable distribution system, an origin content server, a content delivery network (CDN) or the like. In exemplary embodiments, a broadcast source 114 provides live broadcast media programs for which playback of the multimedia content is anchored to a particular point in time, such as, for example, a scheduled start time or air time for a prerecorded media program, or the current time (or real-time) for a broadcast of a live event (e.g., a sporting event, an awards show, a breaking news report, or the like).

In this regard, the live broadcast media program may be a television broadcast of a sporting event, a live performance, a live news report, or the like, and may include pre-recorded content intermingled with the live (or real-time) multimedia content, such as slow-motion clips of important events within the live event (e.g., replays) or commercials, which are played in between the live telecast. Thus, live broadcast media programs may be scheduled to be played at a particular point in time according to a schedule of the live event (e.g., there is a "live" point in time to which playback should be synchronized with for playback), as compared to recorded multimedia, video on-demand (VOD), or the like where there is no concept of "lag behind live" when not being played back according to a schedule (e.g., because the program content is pre-recorded and is available in its entirety before playback begins). The multimedia distribution system 100 includes an electronic program guide (EPG) 115, which may be realized as a server, a database, or another device operating on the network 108 that maintains information pertaining to current and/or future broadcasts (or airings) of media programs that are available to be received from broadcast source 114. The EPG 115 may store or maintain metadata and/or other descriptive information for the broadcast media programs, which, in turn, may be utilized by the recommendation engine 120 on the host server 110 to identify media programs likely to be of interest to users.

The illustrated system 100 also includes a data storage element 116, alternatively referred to as a digital video recorder (DVR) or a personal video recorder (PVR), that stores or otherwise maintains recordings of media programs made on behalf of a user. In the illustrated embodiment, the host server 110 is communicatively coupled to a user's DVR 116 via the network 108 to receive or otherwise obtain a listing of the user's recorded media programs, as described in greater detail below. Additionally, the multimedia distribution system 100 may include one or more on-demand programming source(s) 118, which generally represent a provider of media programs for consumption over network 108 on a pay-per-view basis (although some media programs provided by the on-demand programming source 118 may be free), and may be realized as any combination of devices, servers, hardware and/or the like. The on-demand programming source 118 may provide a data feed that includes a listing of media programs available on a pay-per-view basis from the on-demand programming source 118, which, in turn may be utilized by the host server 110 to identify recent media programs likely to be of interest to a user.

It should be appreciated that FIG. 1 is a simplified representation of a multimedia distribution system 100 for purposes of explanation and is not intended to limit the subject matter described herein. In this regard, it should be noted that although FIG. 1 depicts three client devices 102, 104, 106, any number of client device may be present, and practical embodiments of the multimedia distribution system 100 are likely to support a multitude of devices and users for which scaled illustration is impracticable. Additionally, although FIG. 1 depicts the DVR 116 as being coupled to the network 108 and implemented remote from client devices 102, 104, 106 (e.g., "in the cloud"), in alternative embodiments, individual instances of the DVR features and functionality may be implemented locally by respective client devices 102, 104, 106. Furthermore, although FIG. 1 depicts the recommendation engine 120 as being implemented on the host server 110, in alternative embodiments, each client device 102, 104, 106 in the multimedia distribution system 100 may implement its own instance of the recommendation engine 120. In such embodiments, client devices 102, 104, 106 may also locally store usage information associated with their associated user accounts.

Figure 2:
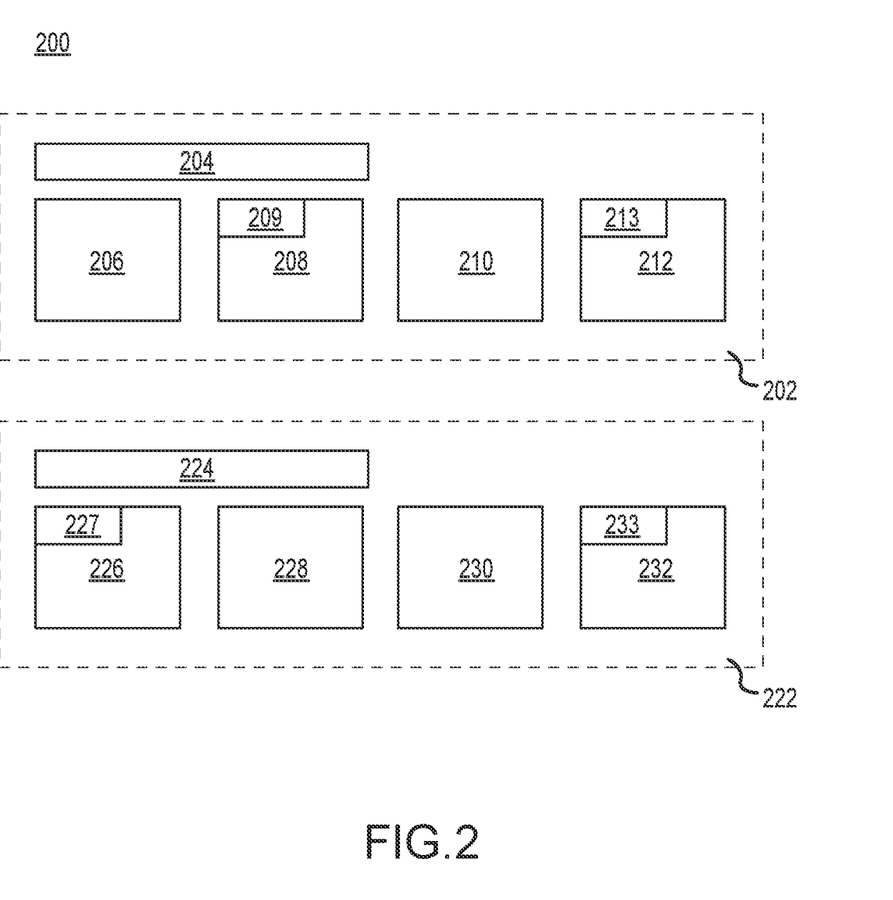
FIG. 2 illustrates an interface for presenting recommended content in accordance with various embodiments.

Referring now to FIG. 2, an example interface 200 is shown for presenting content recommendations, in accordance with various embodiments. Interface 200 includes ribbon 202 and ribbon 222 extending horizontally and each having a row of tiles. Tiles can be variously associated with different content or collections of content available for presentation on system 100. Ribbon 202 includes ribbon title 204 describing a theme of the ribbon indicative of content accessible by the tiles. Themes or ribbon tiles might include recommended for you, trending live, sports, continue watching, new releases, movies, television series seasons, movie franchise, source channels, or other themes suitable for grouping content browsable by tiles.

Each tile 206, 208, 210, and 212 presented in ribbon 202 typically has a characteristic described by the ribbon title 204. Recommendation engine selects which ribbons to present to a user based on information associated with an account, the lineup key associated with the account, or the eligibility key associated with the account. Ribbons may be arranged with tiles showing content available as subscription video on demand (SVOD), SVOD that would be available by modifying the account's active subscription, or transactional video on demand (TVOD), advertising-based video on demand (AVOD), recorded content, broadcast content, or other content available through system 100.

In an example embodiment, ribbon title 204 is a movie franchise about a schoolboy wizard. The first and third movies in the franchise is included in the account's lineup key and available through tiles 206 and 210, respectively. The second and fourth movies in the franchise are indicated as available via subscription change by the account's eligibility key and are accessible through tiles 208 and 212, respectively. Users selecting tiles 208 or 212 to navigate to the corresponding content are guided through subscription update or confirmation before unlocking access to the recommended films associated with tiles 208 and 212. Badge 209 and badge 213 indicate that the recommended content in tiles 208 and 212, respectively, is outside of the subscription level of the active account but viewable by adjusting subscription level or by rental.

The depicted embodiment of FIG. 2 shows interface 200 with two ribbons, though equivalent interfaces can include any number of ribbons with the depicted screen of interface 200 being scrollable to access different ribbons. Each ribbon includes content grouped based on different a theme. Continuing the above example, ribbon 222 includes tiles 226, 228, 230, and 232. The tiles presented in ribbon 202 typically recommend content having a characteristic described by the ribbon title 224. Recommendation engine 120 selects ribbon title 224 and the content recommended in the tiles based on information associated with an account, the lineup key associated with the account, or the eligibility key associated with the account. Badge 227 and badge 233 indicate that the recommended content in tiles 226 and 232, respectively, require additional steps to view. Recommended content with additional steps indicated by a badge can appear at any position or any frequency within a ribbon. Recommended content with additional steps for viewing can appear in the first, second, third, or fourth positions from left to right as depicted embodiment of interface 200, for example.

Figure 3:
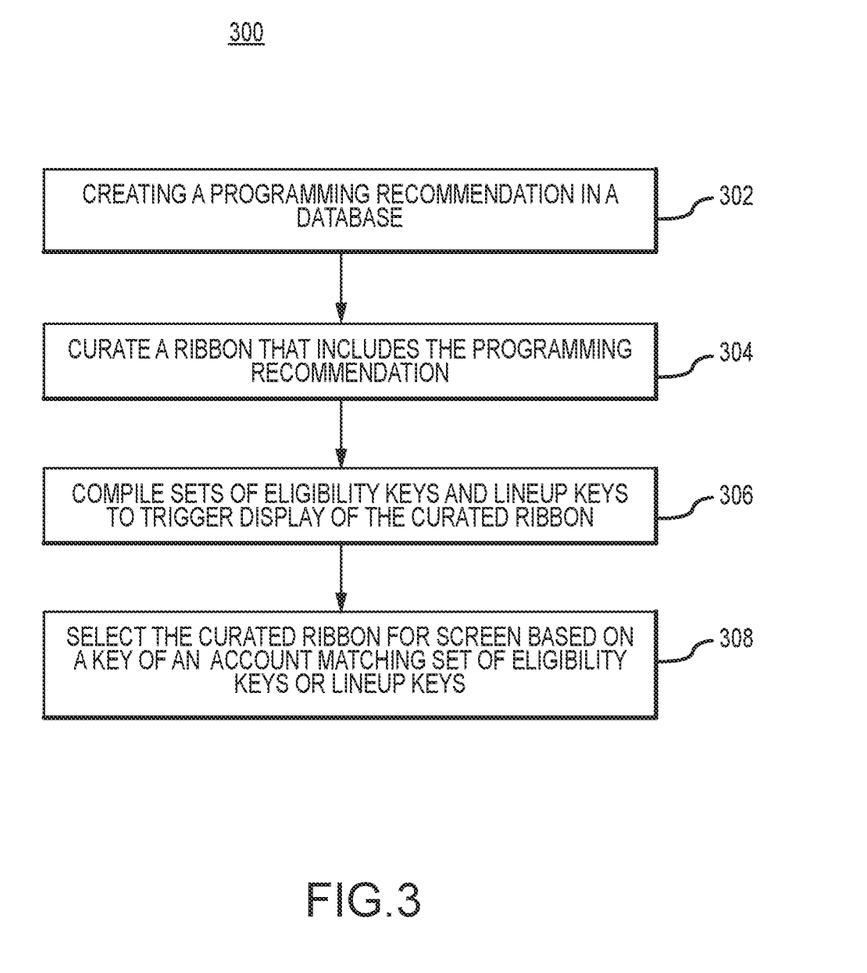
FIG. 3 illustrates an example process for curating recommended content in accordance with various embodiments.

The recommended content in ribbons of interface 200 is curated using process 300 of FIG. 3. Curated content is subsequently retrieved using lineup keys or eligibility keys to identify suitable to populate interface 200. Process 300 can include creating a programming recommendation retrievable from a database (Block 302). Programming recommendations are stored in database 112 in the depicted system 100 of FIG. 1, though other embodiments could store programming recommendations in any desired data storage format or location.

In various embodiment, a programming recommendation includes a program title, a display image, a recommendation period, subscription level that can access the programming, eligibility for upgrades to access the programming, franchise name, source channel, an active/inactive flag, or other information useable to generate a tile for recommended content. The recommendation period is identified by a start date and end date during which the promotion can be presented in a ribbon. The franchise name can be an indicator for a television series, a movie franchise, a video collection, or any other grouping of content suitable for delivery to subscribed accounts. The source channel can be a television broadcast channel, an online streaming channel, a recorded channel, or any other source for video content deliverable by system 100.

System 100 can generate programming recommendations automatically in some embodiments. Recommendation engine 120 can populate database 112 with potential recommendations having selectable fields based on the program title, recommendation period, lineup keys with access, eligibility keys with an upgrade path to access, franchise name, source channel, and active/inactive flag for each program or franchise available to subscribers. The promotions can be selected and curated into a ribbon by selecting desired promotions from database 112 based on any combination of the foregoing fields or tags or other fields or tags associated with promotable content.

Process 300 includes curating a ribbon that includes the programming recommendation (Block 304) in various embodiments. A ribbon may be curated by identifying characteristics of tiles for inclusion in the ribbon, by identifying particular tiles for inclusion in the ribbon, or by populating open space in the ribbon with content available during the promotion period. The tiles can be ordered manually or automatically. In some embodiments, system 100 curates content recommendations for inclusion in a ribbon by matching metadata such as tags or fields in the content recommendations to tags or fields associated with content the account typically views. System 100 may also curate content by considering lineup keys and eligibility keys to determine whether recommendations are accessible by the associated accounts or would be accessible to the associated accounts with a modified subscription.

In various embodiments, a ribbon may be curated by selecting the content the user wants to insert into the ribbon. Server 110 may determine which packages have access to the selected content or an upgrade path to access the content. Server 110 may also determine which corresponding lineup keys and eligibility keys have access to view the content or an upgrade path to view the content. Server 110 presents the ribbon to all accounts that have eligible packages in some embodiments, though in other embodiments server 110 presents the packages to users that select which packages should receive the curated ribbon. In that regard, users can select which subscription levels, packages, or combinations from the eligible subscription levels, packages, or combinations identified by server 110.

A set of lineup keys and eligibility keys is compiled for the curated ribbon (Block 306). The lineup keys and eligibility keys may be automatically compiled by recommendation engine 120 of server 110 in response to the curating user selecting the subscription levels and packages to trigger display of the curated ribbon. Using product offerings of Sling TV as an example, the curating user may select accounts with a subscription level including both Orange and Blue that also includes the optional sports package to receive the curated ribbon. Recommendation engine 120 of server 110 selects all account keys and lineup keys from database 112 associated with the selected package and subscription level combinations to receive the curated ribbon. The curating user may select multiple subscription levels and multiple package combinations to receive the ribbon. In some embodiments, the curating user may select account demographics, viewing habits, or other tags associated with the account to receive the curated ribbon. The curated ribbon is selected for the screen by matching a key associated with an active account to the set of lineup keys or the set of eligibility keys (Block 308).

Figure 4:
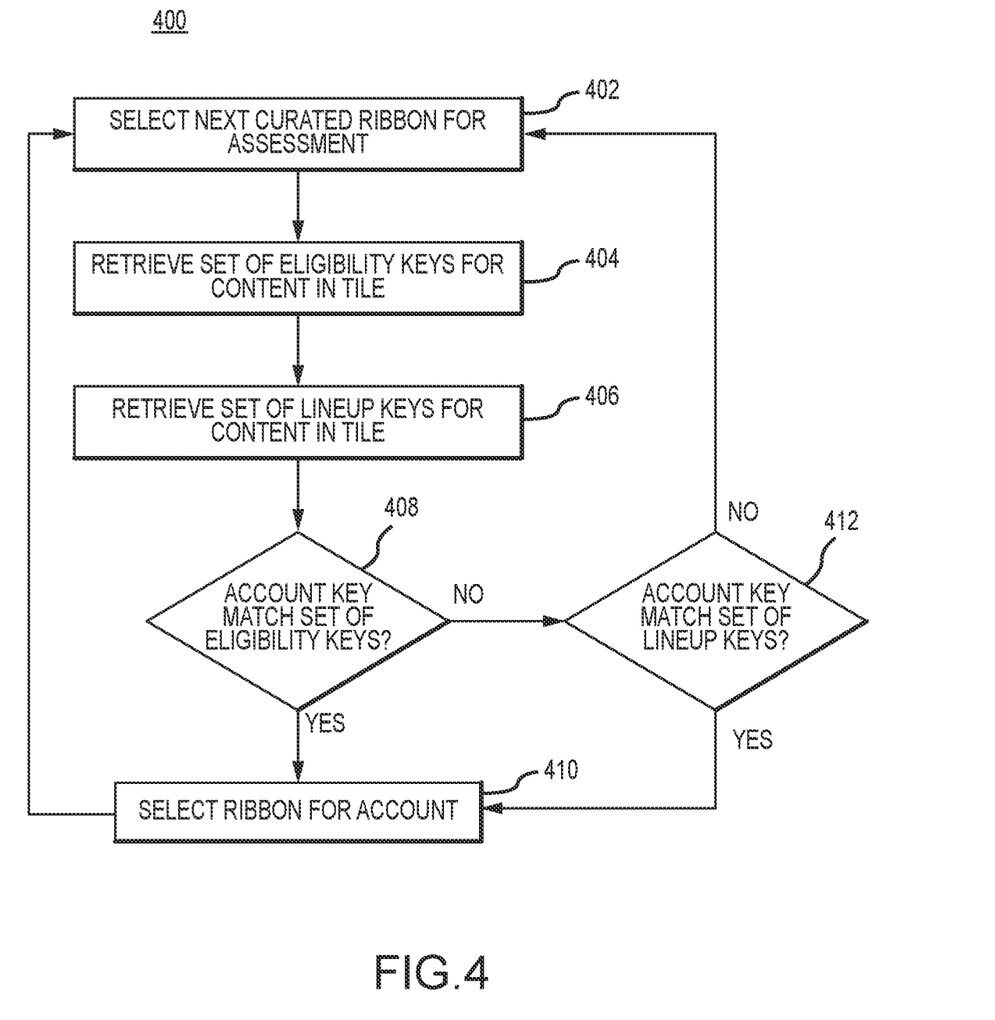
FIG. 4 illustrates an example process for selecting curated content in accordance with various embodiments.

Referring now to FIG. 4, process 400 is shown for selecting a curated ribbon for display to an account, in accordance with various embodiments. Process 400 may evaluate a curated ribbon (Block 402) for presentation to an account. The ribbons may be prioritized, selected at random, scored compared to the account and ordered by highest score, or otherwise evaluated in any order or all at once. Assessment includes comparing the set of lineup keys and eligibility keys associated with the curated ribbon to the lineup key or eligibility key associated with the account. Assessment may also include matching tags or characteristics associated with a tile in the ribbon or the ribbon with tags or characteristics associated with the account.

In various embodiments, server 110 retrieves the set of eligibility keys associated with the ribbon or tile (Block 404) from database 112. Server 110 retrieves the set of lineup keys associated with the ribbon or tile (Block 406) from database 112. Recommendation engine 120 compares the eligibility key from the account to the set of eligibility keys associated with the ribbon or tile (Block 408). In response to matching the account key with the set of eligibility keys associated with the tile or ribbon, the recommendation engine selects the ribbon for display to the account (Block 410). Matching may include detecting the account key in the set of keys. scoring the ribbon or tile relative to the account and detecting a high score or score above a threshold, or otherwise assessing the ribbon or tile relative to the account.

Recommendation engine 120 also compares the lineup key from the account to the set of lineup keys associated with the ribbon or tile (Block 412). In response to matching the account key with the set of lineup keys associated with the tile or ribbon, the recommendation engine selects the ribbon for display to the account (Block 410). Recommendation engine 120 may select another ribbon for assessment in response to the account keys not matching the set of eligibility keys or lineup keys. Recommendation engine 120 may also select another ribbon for assessment in response to selecting a ribbon for display to prepare more content for display to a viewing account in interface 200.

Systems of the present disclosure thus allow selective presentation of video content to users based on their account configurations. A curating user curates tiles and ribbons with content for users, and identifies characteristics of the user accounts that should receive the curated ribbons. System 100 using methods described herein selectively presents curated ribbons to viewers in a manner likely to present relevant content to the viewers.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A method of generating an interface for selecting streaming content on a client device, comprising:
   generating a plurality of curated ribbons using a graphical user interface,
      wherein the curated ribbons comprise groupings of content for selective presentation to user accounts,
      wherein the graphical user interface comprises a curation interface for manual configuration of the curated ribbons by selecting tiles for inclusion in the curated ribbons,
      wherein a ribbon from the plurality of curated ribbons includes a tile of video content in response to the video content being assigned to the ribbon in the curation interface,
      wherein the curation interface assigns the tile to the ribbon by matching fields manually selected in the curation interface with tags of the video content;
   storing the curated ribbons generated using the graphical user interface in a database;
   compiling a set of eligibility keys that identify subscription levels with an upgrade path to access the video content of the tile, wherein the eligibility keys are stored in a first field of the database in association with the ribbon;
   compiling a set of lineup keys that identify subscription levels with access to the video content of the tile, wherein the lineup keys are stored in a second field of the database in association with the ribbon;
   selecting the ribbon from the database by matching a key associated with a user account to the first field or the second field of the database; and
   transmitting the selected ribbon in the interface for selecting the streaming content to the client device in response to the user account associated with the key being authenticated on the client device.

2. The method of claim 1, further comprising:
   receiving an input from the client device selecting the tile; and
   upgrading a subscription level of the user account in response to selection of the tile.

3. The method of claim 2, further comprising beginning playback of the video content on the client device in response to upgrading the subscription level of the user account.

4. The method of claim 1, further comprising beginning playback of the video content on the client device in response to the key associated with the user account matching the set of lineup keys.

5. The method of claim 1, further comprising presenting a ribbon curation interface on a second client device for selecting the tile of video content for inclusion in the ribbon.

6. The method of claim 5, wherein the set of lineup keys that identify subscription levels with access to the video content of the tile corresponds to subscription levels selected in the ribbon curation interface.

7. The method of claim 5, wherein the set of eligibility keys that identify subscription levels with an upgrade path to access the video content of the tile corresponds to subscription levels selected in the ribbon curation interface.

8. A content selection system having a processor in communication with non-transitory data storage, wherein the processor is configured to execute instructions stored in the non-transitory data storage that cause the content selection system to perform operations, comprising:
   generating a plurality of curated ribbons using a graphical user interface,
      wherein the curated ribbons comprise groupings of content for selective presentation to user accounts,
      wherein the graphical user interface comprises a curation interface for manual configuration of the ribbons by selecting tiles for inclusion in the curated ribbons,
      wherein a ribbon from the plurality of curated ribbons includes a tile of video content in response to the video content being assigned to the ribbon in the curation interface,
      wherein the curation interface assigns the tile to the ribbon by matching fields manually selected in the curation interface with tags of the video content;
   storing the curated ribbons generated using the graphical user interface in a database;
   compiling a set of eligibility keys that identify subscription levels with an upgrade path to access the video content of the tile, wherein the eligibility keys are stored in a first field of the database in association with the ribbon;
   compiling a set of lineup keys that identify subscription levels with access to the video content of the tile, wherein the lineup keys are stored in a second field of the database in association with the ribbon;
   selecting the ribbon from the database by matching a key associated with a user account to the first field or the second field of the database; and transmitting the selected ribbon to a client device in an interface for selecting the video content in response to the user account associated with the key being authenticated on the client device.

9. The content selection system of claim 8, further comprising:
receiving an input from the client device selecting the tile; and
upgrading a subscription level of the user account in response to selection of the tile.

10. The content selection system of claim 9, further comprising beginning playback of the video content on the client device in response to upgrading the subscription level of the user account.

11. The content selection system of claim 8, further comprising beginning playback of the video content on the client device in response to the key associated with the user account matching the set of lineup keys.

12. The content selection system of claim 8, further comprising presenting a ribbon curation interface on a second client device for selecting the tile of video content for inclusion in the ribbon.

13. The content selection system of claim 12, wherein the set of lineup keys that identify subscription levels with access to the video content of the tile corresponds to subscription levels selected in the ribbon curation interface.

14. The content selection system of claim 12, wherein the set of eligibility keys that identify subscription levels with an upgrade path to access the video content of the tile corresponds to subscription levels selected in the ribbon curation interface.

15. A computer program product tangibly embodied in a computer-readable storage device and comprising a set of instructions that, when executed by a processor, cause the processor to perform operations, the operations comprising:
generating a plurality of curated ribbons using a graphical user interface,
wherein the curated ribbons comprise groupings of content for selective presentation to user accounts,
wherein the graphical user interface comprises a curation interface for manual configuration of the ribbons by selecting tiles for inclusion in the curated ribbons,
wherein a ribbon from the plurality of curated ribbons includes a tile of video content in response to the video content being assigned to the ribbon in the curation interface,
wherein the curation interface assigns the tile to the ribbon by matching fields manually selected in the curation interface with tags of the video content;
storing the curated ribbons generated using the graphical user interface in a database;
compiling a set of eligibility keys that identify subscription levels with an upgrade path to access the video content of the tile, wherein the eligibility keys are stored in a first field of the database in association with the ribbon;
compiling a set of lineup keys that identify subscription levels with access to the video content of the tile, wherein the lineup keys are stored in a second field of the database in association with the ribbon;
selecting the ribbon from the database by matching a key associated with a user account to the first field or the second field of the database; and
transmitting, to a client device, the selected ribbon in an interface for selecting the video content in response to the user account associated with the key being authenticated on the client device.

16. The computer program product of claim 15, wherein the operations further comprise:
receiving an input from the client device selecting the tile; and
upgrading a subscription level of the user account in response to selection of the tile.

17. The computer program product of claim 16, wherein the operations further comprise beginning playback of the video content on the client device in response to upgrading the subscription level of the user account.

18. The computer program product of claim 15, wherein the operations further comprise presenting a ribbon curation interface on a second client device for selecting the tile of video content for inclusion in the ribbon.

19. The computer program product of claim 18, wherein the set of lineup keys that identify subscription levels with access to the video content of the tile corresponds to subscription levels selected in the ribbon curation interface.

20. The computer program product of claim 18, wherein the set of eligibility keys that identify subscription levels with an upgrade path to access the video content of the tile corresponds to subscription levels selected in the ribbon curation interface.

* * * * *